United States Patent
Zhang et al.

(10) Patent No.: US 10,200,480 B2
(45) Date of Patent: Feb. 5, 2019

(54) SYSTEM AND METHOD FOR CONNECTIVITY MANAGEMENT

(71) Applicants: Hang Zhang, Nepean (CA); Sophie Vrzic, Kanata (CA); Nimal Gamini Senarath, Ottawa (CA)

(72) Inventors: Hang Zhang, Nepean (CA); Sophie Vrzic, Kanata (CA); Nimal Gamini Senarath, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 232 days.

(21) Appl. No.: 15/195,673

(22) Filed: Jun. 28, 2016

(65) Prior Publication Data

US 2016/0381146 A1    Dec. 29, 2016

Related U.S. Application Data

(60) Provisional application No. 62/186,168, filed on Jun. 29, 2015.

(51) Int. Cl.
*H04L 29/08* (2006.01)
*H04W 4/02* (2018.01)
(Continued)

(52) U.S. Cl.
CPC .......... *H04L 67/141* (2013.01); *H04L 67/303* (2013.01); *H04W 4/025* (2013.01);
(Continued)

(58) Field of Classification Search
USPC ....................................... 709/228, 203, 239
See application file for complete search history.

(56) References Cited

U.S. PATENT DOCUMENTS

| | | | | |
|---|---|---|---|---|
| 7,010,615 | B1* | 3/2006 | Tezuka | H04L 67/322 709/224 |
| 7,739,138 | B2* | 6/2010 | Chauhan | G06Q 10/06 705/7.14 |

(Continued)

FOREIGN PATENT DOCUMENTS

| | | |
|---|---|---|
| CN | 104144425 A | 11/2014 |
| WO | 2011134099 A1 | 11/2011 |
| WO | 2012060748 A1 | 5/2012 |

OTHER PUBLICATIONS

International Search Report and Written Opinion dated Sep. 6, 2016 for PCT/CN2016/087642, filed Jun. 29, 2016.

(Continued)

*Primary Examiner* — Jude Jean Gilles

(57) ABSTRACT

One aspect of the present invention is to provide a Connectivity Management (CM) function for use in networks such as a wireless network. The CM function can support both User Equipment (UE) and Machine Type Communication (MTC) devices in the network. In one embodiment of the first aspect, there is provided methods and systems for CM for a plurality of different types of devices that may evaluate tracking criteria to determine where and when wireless resources will need to be allocated to a wireless device. In some embodiments, these tracking criteria include location tracking and/or activity tracking. Another aspect provides for the instantiation of virtual CM functions established at appropriate physical nodes to provide device specific or service specific CM.

24 Claims, 11 Drawing Sheets

(51) Int. Cl.
*H04W 4/029* (2018.01)
*H04W 72/04* (2009.01)
*H04W 28/26* (2009.01)
*H04W 64/00* (2009.01)
*H04W 88/06* (2009.01)

(52) U.S. Cl.
CPC ......... *H04W 4/029* (2018.02); *H04W 72/048* (2013.01); *H04W 28/26* (2013.01); *H04W 64/006* (2013.01); *H04W 88/06* (2013.01)

(56) References Cited

U.S. PATENT DOCUMENTS

| | | | | |
|---|---|---|---|---|
| 9,036,509 B1* | 5/2015 | Addepalli | ............. | H04W 4/046 370/259 |
| 9,654,357 B2* | 5/2017 | Fox | .................... | H04L 41/5025 |
| 2004/0013129 A1* | 1/2004 | Fang | .................... | H04J 3/1617 370/466 |
| 2010/0210280 A1* | 8/2010 | Haynes | ................ | G01S 5/0205 455/456.1 |
| 2010/0218018 A1* | 8/2010 | Parker, Jr. | ............. | G06F 1/3203 713/322 |
| 2011/0263277 A1* | 10/2011 | Zuniga Gallegos | .. | H04W 16/20 455/466 |
| 2012/0294188 A1* | 11/2012 | Liao | ..................... | H04W 4/001 370/254 |
| 2013/0035083 A1 | 2/2013 | Kadel | | |
| 2013/0144969 A1* | 6/2013 | Holden | ............ | H04N 21/47202 709/217 |
| 2013/0155959 A1 | 6/2013 | Ikeda et al. | | |
| 2014/0185581 A1 | 7/2014 | Senarath et al. | | |
| 2014/0187242 A1* | 7/2014 | Zhang | ................... | H04W 48/18 455/435.2 |
| 2015/0072705 A1 | 3/2015 | Zhang | | |
| 2016/0057630 A1 | 2/2016 | Guo | | |
| 2016/0112941 A1* | 4/2016 | Desai | ..................... | H04L 12/145 370/329 |

OTHER PUBLICATIONS

3GPP. Change Request TS23.271. 3GPP TSG-SA WG2, Meeting #49 Tdoc S2-053056. Nov. 11, 2005.
Supplementary Partial European Search Report dated Mar. 13, 2018 for corresponding European Application No. 16817246.8 filed Jun. 29, 2016.
Extended European Search Report dated May 15, 2018 for corresponding European Application No. 16817246.8 filed Jun. 29, 2016.

* cited by examiner

FIG 4A

| Service characteristics | Activity predictable 410 | | Activity non-predictable 420 | |
|---|---|---|---|---|
| Location predictable 405 | CM-LT: I<br>CM-AT: B,C,D | 415 | CM-LT: I<br>CM-AT: A | 435 |
| Location non-predictable 430 | CM-LT: D<br>CM-AT: B,C | 425 | CM-LT: A, B, C, D, E, F, G, H, I<br>CM-AT: A, B, C, E | 440 |

FIG 4B

| Deployment scenarios/device capability | Macro-only 460 | Dense 470 | Ultra-dense 480 |
|---|---|---|---|
| Low-end device 450 | CM-LT: I, B<br>CM-AT: B,C 461 | CM-LT: I<br>CM-AT: A 470 | CM-LT: B, C, E, F<br>CM-AT: A, C 481 |
| High-end device (multiple interfaces) 455 | CM-LT: D<br>CM-AT: B,C, E 462 | CM-LT: A, B, C, E, F, G, H, I<br>CM-AT: A, E 472 | CM-LT: B, C, E, F<br>CM-AT: A, E 482 |

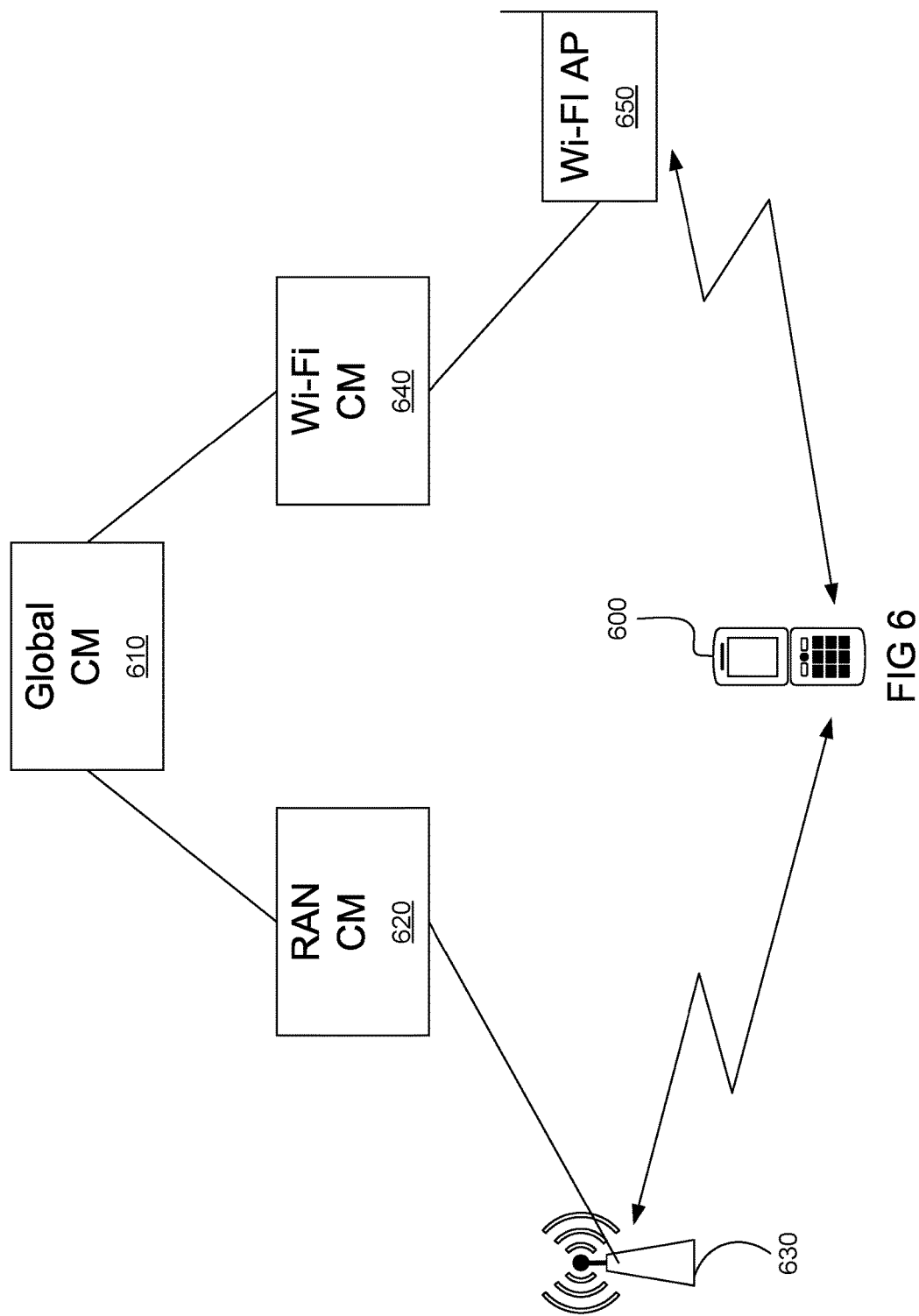

SYSTEM AND METHOD FOR CONNECTIVITY MANAGEMENT

CROSS-RELATED APPLICATIONS

This application claims priority to U.S. provisional application Ser. No. 62/186,168 filed Jun. 29, 2015 entitled "SYSTEM AND METHOD FOR CONNECTIVITY MANAGEMENT FOR WIRELESS DEVICES", the disclosure of which is hereby incorporated by reference in its entirety.

FIELD OF THE INVENTION

The present invention pertains to the field of wireless communications, and in particular to a system and method for locating and communicating with wireless devices in a wireless communications network.

BACKGROUND

Wireless communications networks (WCNs) have undergone several generations of Radio Access Network (RAN) technologies, including so called second generation (2G), third generation (3G) and fourth generation (4G) access technologies. So called fifth generation (5G) RAN technologies are being proposed to various wireless standards groups. In addition to RAN technologies, wireless local area networks (e.g., Wi-Fi based on the Institute of Electrical and Electronics Engineers (IEEE) 802.11 standards) have been developed.

Current WCNs, such as those based on Long-Term Evolution (LTE) standards specified by the Third Generation Partnership Project (3GPP), provide data connectivity to user equipment (UE). These networks have been designed to provide connectivity services to User Equipment (UE) (e.g., mobile phones, smart phones, laptops, tablets, computers, and other user devices). Because not all UEs served by the network are simultaneously active, WCNs are designed to allocate wireless resources to devices as needed. Typically, more resources are allocated to devices in an active state. A device is considered to be in an active state if it is transmitting data, receiving data, or preparing to do so. UEs are configured to enter an idle state while not actively transmitting to both conserve battery power and to reduce the demand on the network.

3G/4G networks have focused on connection management based on a binary status of a UE as being in either an active or an idle state. The allocation of resources to serve UEs is based on these two states for a connected device. Mobile networks, such as those following LTE standards, have been designed to support UE mobility. The assumption in the design of the network is that all UEs can move, either when active or when idle. Because it is important that network entities be able to reach connected UEs, the Mobility Management Entity (MME) has been responsible for connection management. The MME tracks the location of an active UE, with respect to the network topology, and assigns resources to the UE to facilitate both uplink and downlink communications. When a UE is in an IDLE state, the MME assigns a tracking area. When the UE determines that it has left the tracking area, it performs a tracking area update so that the MME can receive updated tracking information. Accordingly, the MME tracks UE location and activity in fairly coarse granularity.

Existing mobile networks have been used to support devices that are not intended to be mobile, such as meters and other sensors that form what is referred to as an "internet of things" (IoT). These devices have similar communication profiles to each other, but differ from many existing UEs. These devices, often referred to as machine-to-machine (M2M) device often generate infrequent small packet based traffic. The frequency with which an M2M device communicates with the network is often very predictable and in some situations it often scheduled. Although this communication profile, often referred to as Machine Type Communication (MTC), results in a small amount of traffic from a single device, an MTC device is rarely deployed as a single instance. Typically, a large number of M2M devices are deployed in a coordinated manner, resulting in a very large number of small messages being transmitted by the M2M devices. In an LTE network, all connected devices are provided the same tracking services, which typically allows a coarse tracking of the UE activity status (e.g. ACTIVE or IDLE) and a UE location (typically with respect to the topology of the network, with more precise location information stored for Active devices than for Idle devices).

As the number of devices connecting to networks increases, and as the needs and capabilities of these devices becomes more varied, a greater need for a more robust connection management system has arisen. Next generation networks could be better served by a connection management system that provided better granularity for both activity and location tracking, and provided different levels of resource allocation for different needs. There exists a need for better connection management for WCNs which provide communication services to both UE and MTC devices.

This background information is provided to reveal information believed by the applicant to be of possible relevance to the present invention. No admission is necessarily intended, nor should be construed, that any of the preceding information constitutes prior art against the present invention.

SUMMARY

In this specification, the term connectivity management will be used to refer to methods and systems for locating and tracking devices and allocating network resources to devices. The term reachability management can also be used.

In a first aspect of the present invention, there is provided a method of connectivity management (CM) for use in a wireless network. The method comprises the steps of selecting a connectivity management policy for a service in the wireless network in accordance with characteristics of the service including device capability, and location predictability associated with devices supported by the service; and transmitting an instruction to a connectivity management function associated with the service, the instruction indicating the selected connectivity management policy.

In an embodiment of the first aspect the method further includes the step of receiving the characteristics of the service from a customer. In another embodiment, the device capability includes information about the radio interfaces supported by devices supported by the service. In a further embodiment, the step of selecting is performed in accordance with an activity profile associated with the service. In another embodiment, the location predictability indicates a degree of location predictability including a fixed position, predictable within a range and unpredictable. In a further embodiment, the step of selecting is performed by selecting a policy profile from a set of predefined policies in accordance with an activity profile and location predictability profile associated with the service, optionally the activity profile indicates an activity status including active, idle and predicted to be active and optionally the predicted to be active state includes an indication of when the device is predicted to be active. In another option, the activity profile and location predictability profile are received from a customer. In another embodiment, the method includes transmitting an instruction to instantiate the connectivity management function on a computing platform in the wireless network. In a further embodiment, the method includes selecting the connectivity management function from a set of connectivity management functions in accordance with the selected policy. In a further embodiment, the method can include re-selecting a connectivity management policy in accordance with location predictability and activity tracking information obtained through monitoring the service; and transmitting an instruction to the connectivity management function associated with the service, indicating the re-selected connectivity management policy.

In a second aspect of the present invention, there is provided a connectivity manager. The Connectivity Manager comprises a network interface, a non-transitory memory and a processor. The network interface enables communication with other nodes in the wireless network. The non-transitory memory stores instructions that when executed by the processor can cause the connectivity manager to select a connectivity management policy for a service in the wireless network in accordance with characteristics of the service including device capability, and location predictability associated with devices supported by the service; and transmit, over the network interface, an instruction to a connectivity management function associated with the service, the instruction Indicating the selected connectivity management policy.

In embodiments, the connectivity manager and processor are configured to carry out the optional embodiments referred to above with respect to the first aspect.

In a third aspect, there is provided a connectivity management method for a wireless network comprising: determining a CM policy dependent on location predictability characteristics and on activity predictability characteristics for a service; and allocating resources to the service in accordance with the determined CM policy.

In embodiments of the third aspect, allocating resources includes instantiating a CM function for the service. In another embodiment, allocating a CM function for the service includes instantiating at least one virtual CM function for the service. In a further embodiment the service is allocated to a mobile device and a device specific CM function is instantiated for the service. In another embodiment the service is allocated to a set of mobile devices. In another embodiment the service is allocated to a customer that operates the set of mobile devices, and wherein determining comprises selecting the CM policy dependent on information about the set of mobile devices supplied by the customer. In a further embodiment the information about the set of devices includes information about the location predictability characteristics and the activity predictability characteristics of the set of mobile devices. In another embodiment determining a CM policy comprises accessing a table to determine a location tracking scheme and an activity tracking scheme.

In a fourth aspect of the present invention there is provided a CM method for a wireless network comprising a first CM function in the wireless network transmitting a query message to a second CM function in a second wireless network, the query message querying the location of a device; and the first CM function receiving a reply from the second CM function, the reply including location information for the device.

In embodiments of the fourth aspect the method further comprises a first CM function transmitting the location of the device to a third CM function. In another embodiment, the second and third CM functions are in different network domains. In a further embodiment, the third CM function communicates with the device using a first access technology and the second CM function communicates with the device using a second access technology. In a further embodiment, the first CM function is a global CM function which performs CM for the device regardless of which access technology the device last used. In another embodiment, the method further comprises the first CM function transmitting a request message to the second CM function requesting that the second CM function transmit a change message to the device to instruct the device to change to the first access technology. Optionally, the method can further comprise the first CM function receiving a reply from the second CM function responsive to the request message; and the first CM function transmitting an access message to the third CM function indicating that the third CM function can transmit to the device using the first access technology.

In a fifth aspect, there is provided a connectivity management method for wireless devices in communication with a wireless network. The method comprises a first CM function performing CM for a wireless device, the wireless device including a wireless interface switchable between a plurality of wireless access technologies; and the first CM function transmitting a protocol message to the wireless device using a first access technology instructing the device to switch its wireless interface to a second access technology.

In an embodiment of the fifth aspect, the method further comprises the first CM function receiving a location request regarding the wireless device from a second CM function and the first CM function transmitting the protocol message responsive to the location request. In another embodiment the location request indicates that there is data to be transmitted to the device using the second access technology.

In a sixth aspect of the present invention, there is provide a method for communication with a wireless network. The method comprises a user equipment (UE) communicating with a first network using a first wireless interface; the UE receiving a request to communicate with a second network using a second wireless interface; and the UE switching to the second wireless interface to communicate with the second network.

In embodiments of the sixth aspect the method comprises the device transmitting device status information to at least one of the first and second network. In another embodiment, the device status information includes information relating to applications running on the device. In a further embodiment the device status information includes information as to the likelihood of network transmission based on user input relating to at least one of the applications. In a further embodiment, the device status information includes device battery state.

In a seventh aspect of the present invention, there is provided a Connectivity Management (CM) method for a wireless network. The method comprises determining a location tracking scheme according to location predictability characteristics; determining an activity tracking scheme according to activity predictability characteristics; and allocating resources to a service in accordance with determined location tracking scheme and the determined activity tracking scheme.

In an embodiment of the seventh aspect, allocating resources includes tracking the location and activity of devices associated with the service according to the determined location tracking scheme and the determined activity tracking scheme. In another embodiment allocating resources further includes allocating network resources to devices associated with the service as needed depending on the tracked location and activity. In a further embodiment allocating network resources includes the instantiation of network functions. In another embodiment the service is for a specific device and further comprising using network topology and device capabilities to determine the location tracking scheme and activity tracking scheme when both the location and activity predictability characteristics of the device are unpredictable.

In other aspects of the present invention there are provided network nodes or functions for carrying out the methods of the above aspects.

BRIEF DESCRIPTION OF THE FIGURES

Further features and advantages of the present disclosure will become apparent from the following detailed description, taken in combination with the appended drawings, in which:

FIGS. 4A and 4B are tables illustrating customization of CM according to an embodiment.

FIG. 6 is a diagram illustrating a device connecting to a network using multiple interfaces according to an embodiment.

It will be noted that throughout the appended drawings, like features are identified by like reference numerals.

DETAILED DESCRIPTION

Figure 1:
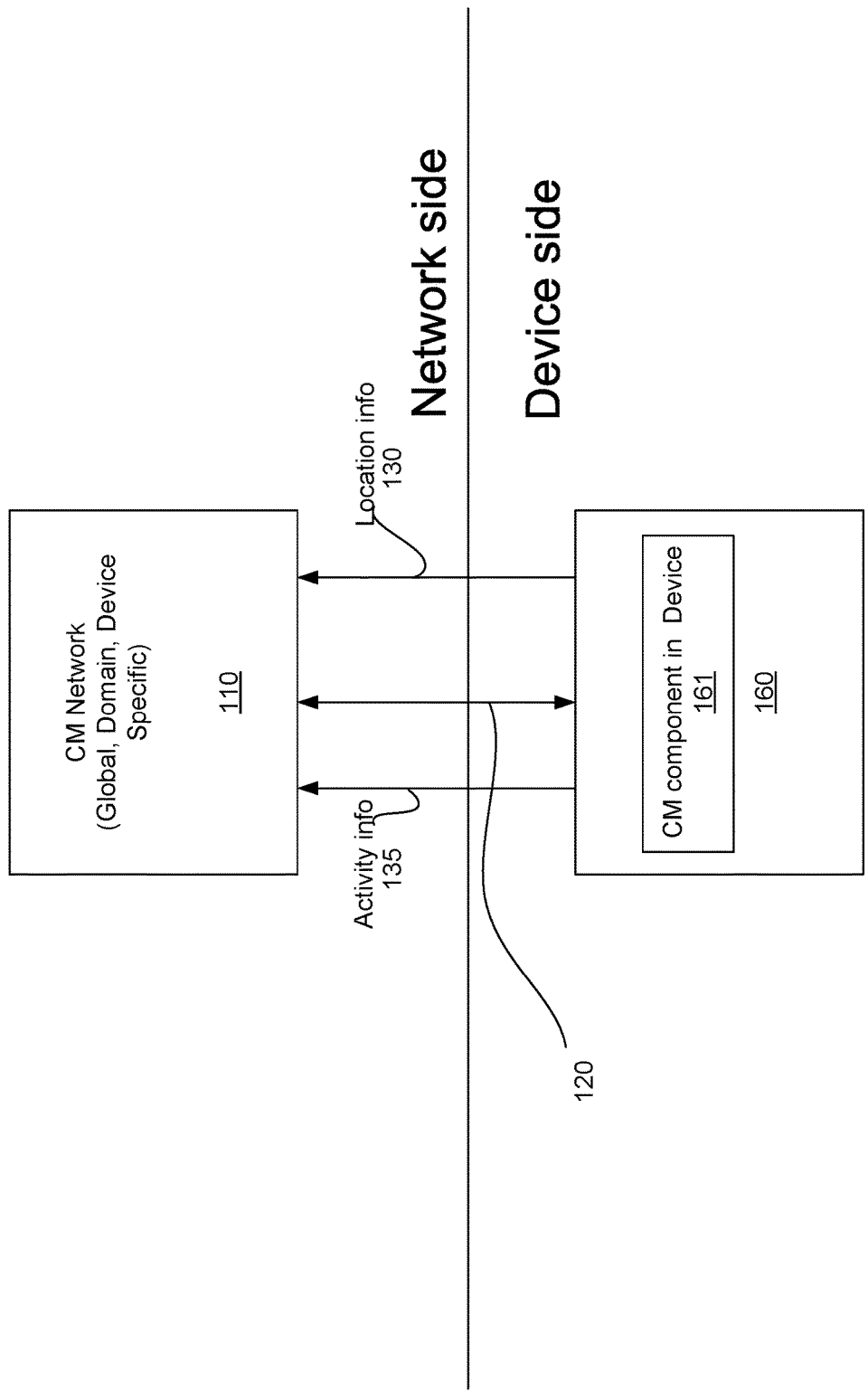
FIG. 1 is a diagram illustrating a user device communicatively coupled to a connectivity management (CM) network according to an embodiment.

In a conventional Long-Term Evolution (LTE) network, the Mobility Management Entity (MME) tracks the state and location of connected devices. Connected devices are considered to be in either the active or idle state. When in an active state, the MME can direct traffic received by a Serving Gateway (SGW) to an eNodeB (eNB) to which the User Equipment (UE) is connected. In an idle state, the resources allocated to an active UE session are released, and the UE is assigned a tracking area. The granularity with which the location of an idle UE is tracked is the tracking area. When data arrives for the UE at an SGW, the MME instructs eNBs within the tracking area to page the UE. In the idle state, the UE can enter a lower power consumption state that allows it to turn off its receiver for long stretches of time. The UE is provided with a paging cycle as it enters the idle state which defines when the UE should wake up, and listen for a paging message. When a page is issued, and the UE receives it, the UE will re-attach to the network, and receive the information received at the SGW.

UEs enter the idle state to conserve battery power and to allow network resources, e.g. resources allocated to the UE at the eNodeB, to be released and used by other devices.

Radio Access Networks (RANs) have typically been designed to support high mobility devices with unpredictable traffic demands. It is expected that Next Generation Networks will support a much larger number of devices as M2M deployments increase. While some of these new devices will have reduced mobility others, such as devices used to facilitate vehicle-to-vehicle and vehicle-to-infrastructure communications will be very mobile. The increasing number of devices will also result in a large number of devices that have different reliability needs. While some devices can have theft access rescheduled, other devices will need ultra-reliable access under almost all circumstances. With previous network architectures, decisions were made that assumed that all connected devices would be somewhat similar in theft needs, and that when this was not the case it would be so infrequent that over provisioning a device was not a large burden. As the number of connected devices served by RANs increase, the number of different mobility and activity profiles will also increase. Treating all connected devices in a very similar way will no longer be possible without resulting in a vastly over-provisioned network. As such, a more flexible method of handling network tracking of UE connections is required.

An aspect of the invention recognizes that handling resource allocation as a matter of connection management to all devices in the same manner may not be efficient when there are different classes of devices. To address this, a system and method of connectivity management (CM) will now be discussed that allows for a more finessed treatment of resource allocation. Some embodiments allow for allocation of cloud resources in addition to allocation of resources in edge nodes. In some embodiments allocating resources includes the instantiation and activation of network functions. Some embodiments allow for pre-emptive allocation of resources in accordance with predictive usage, and can allow for gradations in the increase or reduction of resources allocated to a wireless device.

In designing a network, there is a tension between wanting to simplify the administrative aspects of offering CM services and wanting to provide the most detailed CM service to each device. Administratively, the simplest solution is to treat all devices in the same way. This reduces the complexity of the administrative tasks by making them uniform across the entire network, but it either neglects some devices or overprovisions the network for others. By treating each device as a unique entity, the administrative burden of determining how CM services can be offered becomes overly complex as well. To address this, embodiments of the present invention offer customized CM services to each admitted network service. Because service providers have a priori information about the intended deployment, and in many cases will be using the CM data as well, the CM services used for the admitted service can be tailored to their needs. In these embodiments, this obviates the need to try to match a CM service to the functions and needs of each individual device, but also avows the network overall to provide a more tailored approach to CM.

Embodiments provide CM functionality to allocate the appropriate wireless resources in order to establish access links between devices and access nodes. Access nodes are edge nodes which are also known as access points (APs). APs will potentially be involved with both downlink (DL) transmissions to a device, and uplink (UL) reception of signal transmissions from a device. APs can include Distributed RAN (D-RAN) and Cloud/centralized-RAN access nodes, eNodeBs and other types of access nodes.

Embodiments consider one or more of the following factors which impact CM from a service point of view: Activity tracking (which includes activity prediction), location tracking (which includes location prediction), delay requirements, and other factors.

Connectivity Management allows the network to determine how to reach a device served by network. Where in an LTE network, a device's activity status was simply tracked as active and idle, in some embodiments Activity tracking includes the state of the device (e.g., whether it is active or idle) and other information that may be used to predict the activity of a device (with respect to the need for the allocation of wireless resources). While some devices, such as a UE used for accessing voice and data services at the whim of a user, are relatively unpredictable with respect to the activity status (e.g. it is difficult to predict when a UE will switch from idle to active), many MTC devices can be setup to access the network according to a schedule. This schedule is outside the conventional understanding of activity tracking, but is incorporated in the CM discussed herein. This could be tracked as a "predicted to be active" state that may indicate when the device is next expected to be active. Accordingly, one of the tracking criteria that can be used is the predictability of DL/UL message delivery timing. Where device activity (e.g. for Machine Type Communication (MTC) traffic) is predictable or scheduled, the prediction information can be used as a part of the information used in Activity Tracking. For example, smart meters which report utility usage at predetermined intervals to a utility are predictable (due to the pre-arranged times for such transmissions). A conventional LTE network allocates resources to idle Machine to Machine (M2M) devices. A network, according to embodiments using the CM functionality discussed herein, can take advantage of the lack of mobility and the reliable schedule of device transmissions to de-allocate all resources from the M2M device most of the time. Using the predetermined schedule associated with these devices, the network can allocate network resources to the M2M device in anticipation of the next transmission. From the perspective of the device, the required services and resource allocation are provided, but from the perspective of the network the burden of the allocated resources is diminished.

In some embodiments, a virtual CM function can be instantiated in the network. A virtual CM function can be specific to either an individual device (e.g. a virtual user-specific CM function) or it can be instantiated to serve the devices associated with a single service (e.g. a service specific CM function). According to embodiments, these CM functions can ensure the allocation of appropriate resources to manage the predicted transmission at the predetermined time. Other MTC communications may be less predictable, or even unpredictable. For example, some industrial control devices or sensors only transmit in response to an indication that an error condition has occurred. Another activity tracking criteria which can be used by a CM entity is the correlation of UL and DL traffic. In monitoring traffic exchanges, it may be possible to identify a pattern of activity in UL and DL traffic. Such activity can be either Correlated or Non-correlated. For example, if there is a discernable pattern between requests and responses, the need for wireless resources for a response can be predicted once the request is made. For example, if a particular message is used to send a request to an M2M device and the response is of a known size and occurs at a predictable time (e.g. a request for usage information from a smart meter is a small downlink message that will be associated with a larger uplink message either at a fixed time, or at a fixed time after the request), the CM can identify the message and ensure the allocation of resources in a just-in-time fashion. Similarly, in a sensor network, a service-specific CM may be able to identify patterns. For example, if a defined number of sensor devices send UL messages in a certain pattern, then another part of the network, such as a management node, will typically generate a message in response. For example, if 5 sensor nodes report a certain condition, then a management node will typically send an incident report. These types of patterns and the occurrence of the triggering messages can allow a service-specific CM to allocate the necessary resources to accommodate the predicted transmission.

Location tracking involves tracking the location of the device in relation to the topology of the network. Conventionally, location tracking has related to determining which tracking area (TA) an idle UE is in, or to which eNodeB the active UE is connected. Conventional connection management only utilized the TA along with a paging cycle scheme to connect to a device. The TA involved a list of APs within range of a device, or expected to be in range of a device based on its last known location. A paging cycle scheme typically involves an idle device being instructed to wake up and check for data at specified intervals, which may be configurable. An idle UE is provided with both a paging cycle and a tracking area. The UE will wake up and listen at intervals determined by the paging cycle. If the UE determines that it is outside its tracking area, it will connect to the network to receive a tracking area update. Accordingly, a device which is in idle mode will listen to the network according to its paging cycle, and will advise the network as to its current location as needed. The CM function discussed herein provides greater detail in the location tracking of a device. Future networks will likely include a variety of different access technologies, including current standardized RAN formats (e.g. LTE) as well as future RAN standardized formats and other connection technologies (e.g. Wi-Fi). Much as the activity tracking functions of the CM can take the predictability of a UE activity into account, so to can the location tracking functions. A set of m2m devices that are on a train, or other scheduled transportation, may have a very predictable mobility. As long as the location of the train is known (and if it is properly scheduled this may be known in advance), the location of the M2M devices can also be known. A device that is installed in a fixed position, such as an electrical meter, can be simply assigned a location and tracking may not need to be enabled.

A CM function can track the UE connection across multiple AP types to help the network determine the device's ability to receive from and transmit to particular APs. Accordingly, one of the tracking mechanisms used by embodiments is the location predictability of the device. A device's location can be predictable in various degrees. A device's location can be very predictable if the device is not mobile and is secured to a fixed location. A device's location can be predictable within a range, for example if the device has a pre-defined route/speed (for example a device on trains, subways, or some industrial vehicles). A device's location can also be unpredictable, which is often the case for many UEs subject to random mobility.

Delay requirements are another factor which can be considered in some embodiments. Some applications are delay sensitive, for example real time communications including voice calls or video conferences, whereas other applications may be relatively delay insensitive, for example a short message service or many M2M reporting sessions. Embodiments can de-allocate resources for delay insensitive applications until the resources are actually needed or until sufficient resources are available.

Other factors considered by embodiments include the characteristics of the devices used in a service, for example whether the device is a multi-interface device which can connect to multiple wireless network access technologies (e.g., 3G, LTE, WiFi, and 5G). The characteristics of the device can include the specifications of the device and its expected usage, as they apply to the service being supported. For example, a device with sufficient specifications (in terms of hardware) may be able to implement a device-based v-CM function to aid in predictions and help determine resource allocation requirements. Further, the expected usage can include an indication as to whether the device is intended to act as a UE to a human user or as an M2M device such as a sensor which can be more predictable, as discussed herein. Whether the device is a multi-interface device indicates whether the device can support more than one access technology or interface (e.g. supports 2G, 3G, 4G, 5G, Wi-Fi, GPRS, HSPA, GSM, LTE, etc).

In some embodiments, the CM function can evaluate if the device is active or not on a per interface basis, and, if active, which interface is active. In one example, a device with both LTE and Wi-Fi radios will typically disconnect from the LTE network in favour of a Wi-Fi connection for data sessions. From the perspective of an LTE RAN, the device is not connected, but the device is still connected through the WiFi connection and can still receive data. A conventional MME may consider the device to be unattached to the network because the MME is solely focussed on the allocation of radio resources and resources in the eNodeB in particular. However, according to embodiments, a CM function can also account for the allocation of resources associated with the UE in a network operator's cloud network. Accordingly, the network technology/interface can be considered by the CM function, because as long as a device is reachable by one technology, it will not likely require access to the other network interfaces at the same time. Further, as will be discussed in more detail below, in some embodiments a CM function can instruct a device to switch interfaces if required.

FIG. 1 is a functional diagram of a CM network entity 110 communicatively coupled via a wireless interface 120 to a wireless device 160, according to an embodiment. In some embodiments, the CM entity 110 is a CM function executed by the processor of a network element or host. The wireless interface 120 can be a RAN interface (e.g. LTE), or a wireless local area network interface (e.g., Wi-Fi based on the Institute of Electrical and Electronics Engineers' (IEEE) 802.11 standards). The CM network entity 110 may be wholly deployed on a wireless communications network (WCM) or comprise various modules or functions which are selectively deployed within a WCM, as will be discussed in further detail. The CM network entity 110 is configured to perform CM for the wireless device 160. In some embodiments, the CM comprises location tracking (CM-LT), in which case location information 130 is determined for the wireless device 160. Some of this location information can be determined by the device 160 and transmitted to the CM network entity 110. Accordingly, in some embodiments the wireless device 160 includes a CM component 161 which can provide the location information 130 and other CM related information to the CM network entity 110. In some embodiments, the CM performs activity tracking (CM-AT), in which case activity information 135 is determined for the wireless device 160. Again, some of this location and activity information can be determined by the device 160 and transmitted to the CM network entity 110 using the device CM component 161. Some embodiments perform both CM-LT and CM-AT. Although only one wireless device 160 is shown in FIG. 1, it should be appreciated that the CM network entity 110 can be configured to perform CM for a plurality of wireless devices. Some networks will support thousands of devices, which may contain many more MTC devices than UEs.

In some embodiments, the network side CM entity 110 uses received activity and location information to make predictions as to what resources will need to be allocated to particular wireless devices. The CM entity 110 then allocates the resources to provide connectivity to the wireless devices. It should be appreciated that the CM entity interacts with other network functions to allocate the resources. In some embodiments, these predictions can be shared with a device side CM component 161 installed in wireless devices to obtain feedback that helps refine the predictions. Additionally, when resource allocations affect the connectivity status of the device, the CM entity 110 can inform the UE CM entity 161 of a change.

Figure 2:
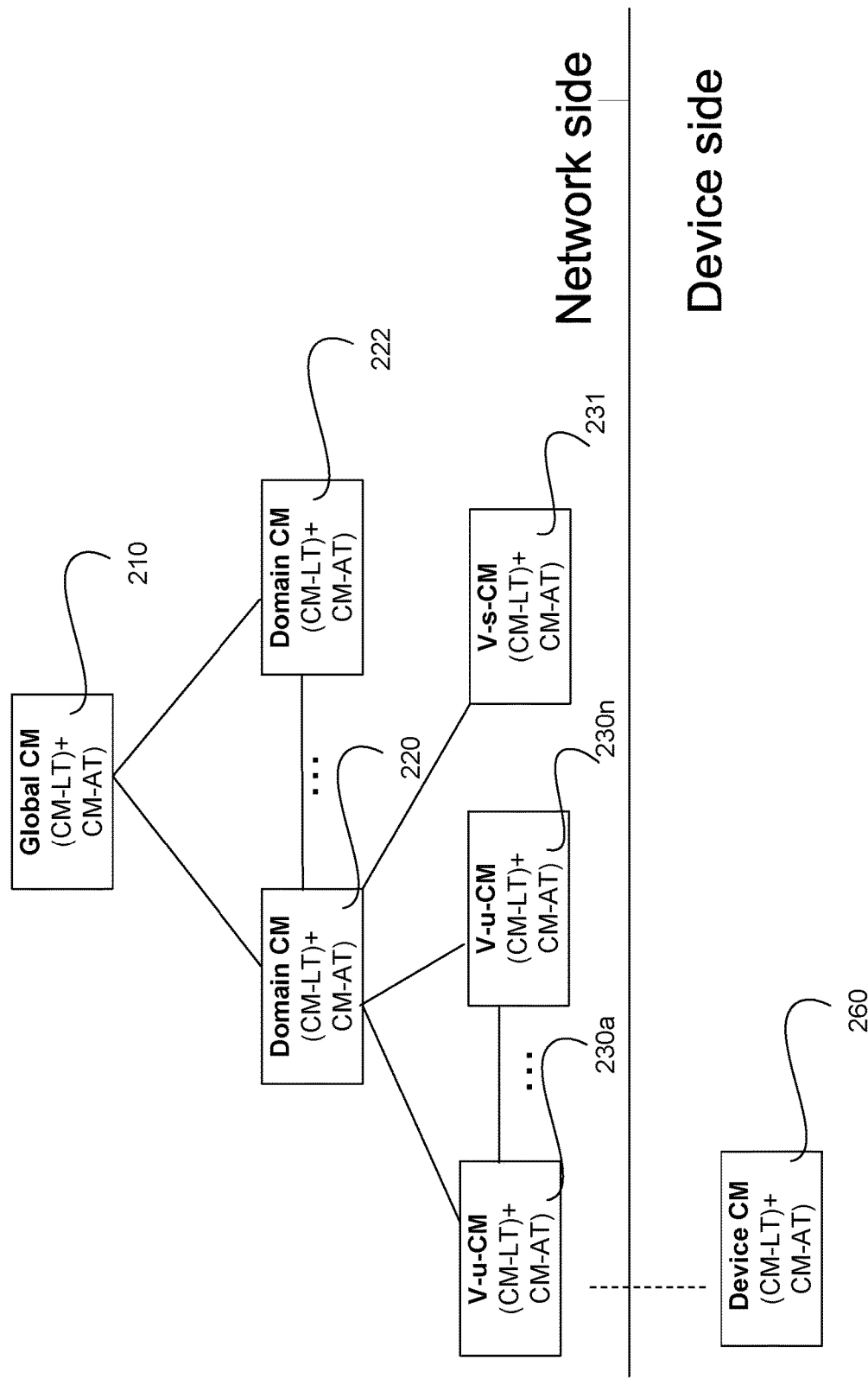
FIG. 2 is a diagram illustrating a hierarchical layout of a CM network including a plurality of CM instances according to an embodiment.

FIG. 2 illustrates the logical architecture of connectivity managers or CM functions, according to an embodiment. As shown in FIG. 2, there can be many instances of CM functions, each providing different aspects of CM. A global CM function 210 can manage the CM of a network, through interactions with domain-specific CM functions 220-222. A domain can be a network operated by a network operator. Some larger network operators may choose to subdivide large networks into multiple domains. Domain-specific CM functions perform CM functions within the domain, as well as inter-CM signaling across domains. Edge functions are typically performed for a local area by a function implemented in a network edge node, such as an AP. Virtualized instances of an edge CM function can be user specific, as shown with Virtual user-specific (V-u) CM instances V-u-CM 230a . . . V-u-CM 230n, or can be service specific as shown by V-s-CM 231, with each service specific virtual CM function serving a group or class of devices which connect using the same service. A v-u-CM: can be a function instantiated in a node for managing a device's location and activity tracking. A v-s-CM: can be a function instantiated in a node for managing a group of devices associated with a service/slice; or managing a group of devices within a geographic area. The edge functions communicate with a CM component 260 resident in a device. CM component 260 and the respective V-u-CM function 230a communicate with each other to collaboratively perform CM-LT and CM-AT for the wireless device. As the device moves through the network, the V-u-CM function can be migrated to different nodes to better serve the device, as shown through the plurality of instances from 230a to 230n. For simplicity, only one wireless device is shown, but it should be appreciated that many devices will be supported. In some embodiments, each device would be supported by its own V-u-CM function 230a to 230n.

V-u-CM instances such as 230a are instantiated as needed to perform edge CM functions on a per user or per device basis. Instantiating, configuring and activating virtual functions involve the use of network resources. Accordingly some embodiments can more efficiently allocate these resources by instantiating, configuring and activating the virtual functions on an as needed basis. It should be appreciated that each CM instance may be geographically separated and individually deployed on different components of a WCM (not shown). Although not shown, it should be appreciated that service-specific virtual CMs can also be instantiated, for example for a group of MTC devices that all interact with the same service.

Domain-specific CMs and the Global CM may be virtualized entities supported by a data center or across a number of data centers. These entities can be either discrete entities or virtualized functions resident in a cloud environment. Although the use of a v-u-CM is illustrated in FIG. 2, it should be understood that network function virtualization is not necessary. In some embodiments, edge CM functions can be implemented on a per AP basis. Alternatively, a single discrete CM may handle the CM functions for a plurality of different nodes. In some embodiments, for wireless devices capable of supporting enhanced functionality, a CM function 260 (which can be considered a CM agent) can be installed on the device to enhance CM functionality. This can allow for advanced functionality, such as allowing a UE that initializes an application which typically involves transmission to notify the V-u-CM (or other network CM instance) to allocate resources in accordance with a predicted transmission. Accordingly, CM function 260 in UE devices can participate in configuring resources for expected traffic flows. Further, there can be several different interactions between a CM function 260 in a device and the corresponding v-u-CM 230a. For example, there can be a direct link through the RAN. Further, there can in an indirect link over Wi-Fi, in which case signalling between the device CM function 260 and the V-u-CM 230a likely occurs via the internet and the Domain CM 220.

In some embodiments, the Global CM node 210, along with the Domain CM nodes 200 . . . 222 collaborate to replace and enhance the functions previously performed by an MME. Accordingly, such embodiments can be considered to provide CM functionality which expands beyond the manner in which the MME performed connection management. This expansion allows for more information to be taken into account in making resource allocation decisions, including information from the UE and the type of UE. Further, it is noted that the V-u CM nomenclature is used to be consistent with terminology used in the field of virtualized network functions, but it should be appreciated that in the case of MTC devices, these modules can be classified as virtual device-specific CM (V-d CM). Further, some embodiments can establish virtual service-specific CMs (V-s CM) 231 to provide CM to individual services.

Figure 3:
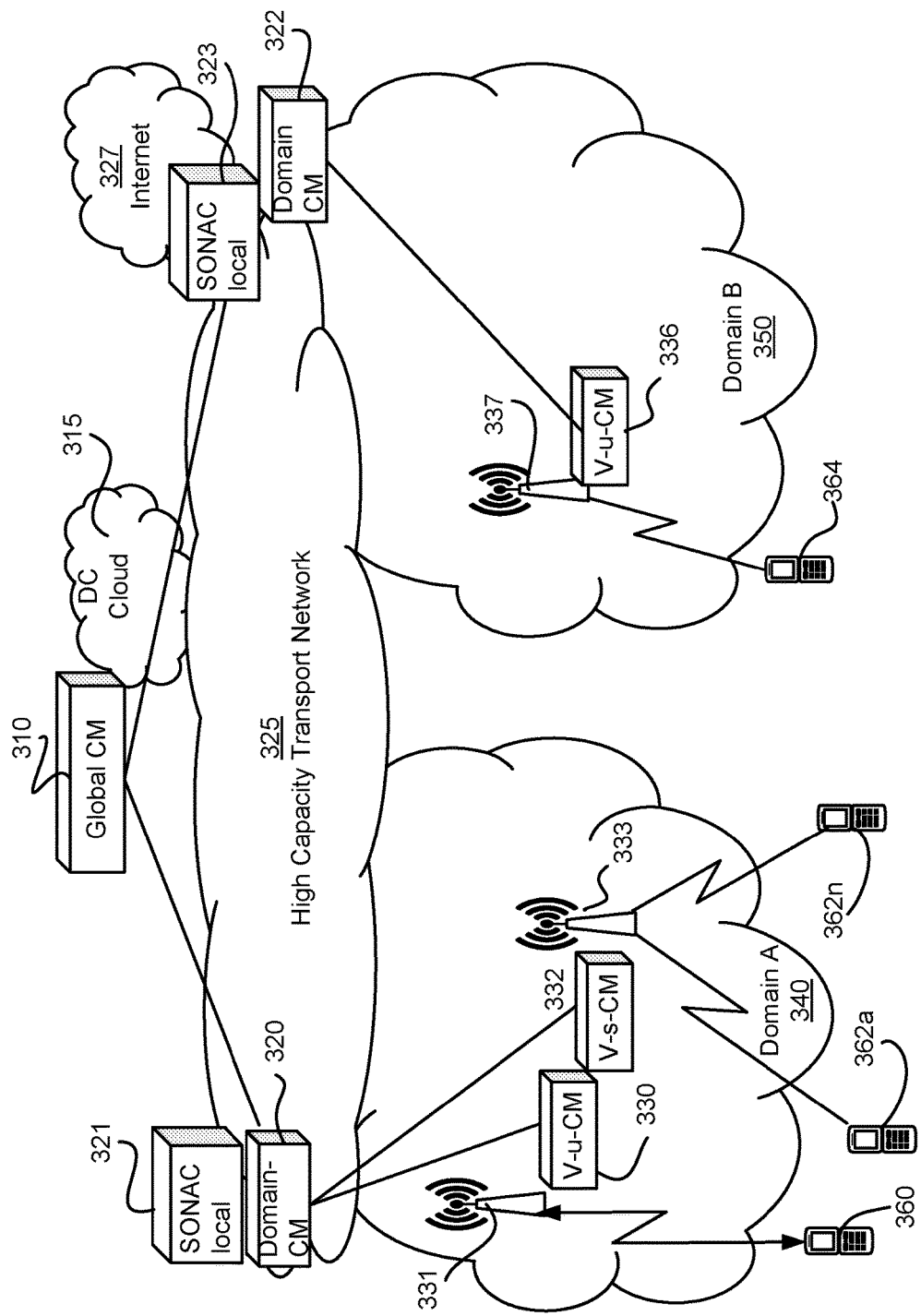
FIG. 3 is a network diagram illustrating an embodiment of a wireless communications network (WCN) which includes a logical CM structure.

Referring to FIG. 3, there is shown an embodiment of a WCN which includes a logical CM structure, as shown in FIG. 2, deployed on different components of the WCN. The example CM hierarchy illustrated in FIG. 3 includes global CM instance 310, which may be deployed in a Data Center (DC) Cloud 315, domain CM instances 320, 322 deployed in conjunction with a software management entities such as a Software Defined Network (SDN) Controller, a Software Defined Topology (SDT) Controller and a Software Defined Protocol (SDP) Controller, which may be embodied together as represented by Service Optimized Network Auto Creation (SONAC) local instance 321, and edge V-u-CM instance 330 and V-s-CM 332 deployed on respective APs 331, 333 of Domain A 340. The global CM instance 310 is communicatively coupled to domain CM instance 320, 322 through a transport network 325 which connects to the internet 327. A first user device 360 is served by V-u-CM instance 330, which may be deployed on AP 331 which connects to UE 360. A set of devices 362a . . . 362n (of which only two are illustrated) is served by service edge CM instance V-s-CM 332 via AP 333. In Domain B 350, a third user device 364 is served by edge CM instance 336 via AP 337. As described above, CM instances may function independently or collaboratively in carrying out respective hierarchical functions to perform CM-LT and CM-AT of respective devices 360, 362, 364 communicatively coupled to the CM network on the WCN.

Referring to FIG. 4A, there is shown a chart illustrating one example for the customization of CM, according to an embodiment. Each type (or class) of service is categorized on the basis of the predictability of the location of the devices used within the service, correlated with the predictability of the data traffic activity associated with the service. The table is divided into columns and rows, with column 410 indicating predictable activity, and column 420 indicating non-predictable activity. Row 405 indicates predictable location, and row 430 indicates non-predictable location. Devices that are predictable in both dimensions are classified in quadrant 415 and may include smart meters as an example. Devices with predictable location but unpredictable data transmissions are classified in quadrant 435 and may include industrial sensors and M2M devices on vehicles with known trajectories and schedules (e.g. M2M devices on trains and subways). Devices with predictable activity but unpredictable location are classified in quadrant 425 and may include MTC devices in automobiles or other vehicles. Quadrant 440 is a categorization that includes devices which are unpredictable in both location and activity, and include what is conventionally referred to as a UE. Current Connection Management is focused on these devices which, while they are the most difficult to handle, will be greatly outnumbered by devices of the other categories in future networks. FIG. 4B is a table showing finer granularity in the schemes which can be applied to devices which are classified in quadrant 440.

In each table entry (e.g. quadrant in FIG. 4A) are non-limiting examples of location (CM-LT) and activity (CM-AT) tracking schemes. In this context a scheme refers to a method for tracking, whether it is the location or activity that is being tracked. Note in some cases, the scheme/method may involve not tracking, in the case of a device which is in a fixed location, in which case the location will not change. Embodiments provide CM schemes for controlling the allocation of resources to devices based on device profiles. These tables should be understood to be a non-exhaustive list of the types of tracking schemes which can be utilized by such a CM system. The schemes are designated as A-H for location tracking and A-D for activity tracking, with further details provided below.

FIG. 4B divides the schemes for quadrant 440 based on the type of device and the deployment scenario of the network in the vicinity of the device. The columns are defined in terms of the density of access point deployment, ranging from Macro-Cell only 460, to Dense deployment 470 to ultra-dense deployment 480 with multiple pico-cells. For the Macro-only deployment 460, this can include 3G/4G APs without differentiation between devices. The two rows of FIG. 4B divide the service based on the device capability, i.e. whether it is a limited functionality device 450 or a device 455 with multiple network interfaces and sufficient resources to support complex functionality.

In addition to selecting the scheme based on the table entries for the service, the CM can also determine which mechanism to employ based on QoE requirements for the service, which may impact the configuration of signaling used and the interval of signaling transmission/monitoring and serving cloud size. For example, the change may be triggered by traffic activity entity (e.g. by v-u-SGWs), customer policy, and device request.

Figure 5A:
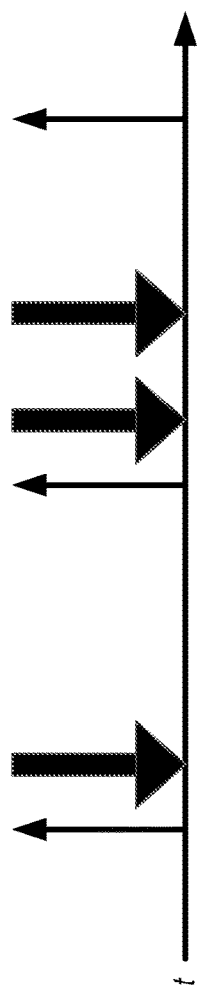
FIGS. 5A and 5B illustrate two example transmission profiles.
Figure 5B:
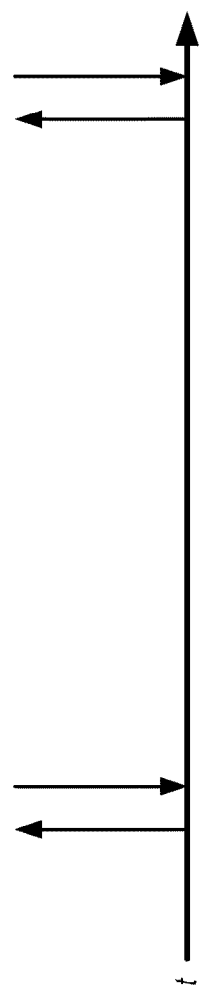

FIGS. 5A and 5B illustrate two different traffic profiles. In FIG. 5A, UL transmissions from the UE to an AP are typically not very large, but are then followed by larger DL transmissions. There is no fixed interval at which these transmissions occur, and there is no pattern to the traffic flow. This is behavior that is common for a human operated UE in an active state, which may request data with a UL connection and then receive a larger volume of data in response. In FIG. 5B, there are only very short small transmissions between the device and the network. In conventional LTE networks, FIG. 5B is representative of a UE's behavior in idle mode, but it may also represent the active mode of an MTC Device. In an LTE network, the MTC device when in an active mode would have the same resources allocated to it as an active UE, when it actually consumes resources with a profile that is closer to an idle UE. One skilled in the art will appreciate that for the traffic profile of FIG. 5B, if the network is aware that the device will follow the traffic profile without modification, the resource needs of the device can be predicted with great accuracy and accounted for in the CM. If the device changes its traffic profile, the CM can change the resource allocation accordingly. Thus, CM according to embodiments described herein could allow for a more effective allocation of resources than currently available using the binary duality of active/idle states, based on the profile of a device (or class of devices using the same service).

The following examples illustrate and describe the schemes for CM-LT and CM-AT that populate the tables in FIGS. 4A and 4B. These schemes may be implemented by the CM networks highlighted in FIGS. 1-3 above, according to various embodiments. The network functions listed below may be performed by a CM Network entity 110 while the device functions may be performed by a CM component in the device 161. In the non-exhaustive example schemes described below, there are nine different location tracking (CM-LT) Schemes (Labelled A-I) and four different activity tracking (CM-AT) schemes (Labelled A-D). The terms CM-LT function or CM-AT function will be used to refer to a CM function for implementing the described scheme. It should be appreciated that the CM-LT function or CM-AT function may be implemented as subroutines within a device side or network side CM function. In some embodiments, a CM-LT function or CM-AT function can be instantiated as part of a device side or network side CM function.

Non-limiting examples for resource allocation (including resources allocated to location tracking and activity tracking, as well as wireless network resources) are discussed below for each scheme.

CM-LT Scheme A: Location Tracking by Periodic DL Measurement and Report

In this scheme, location tracking is performed by periodic DL measurements and reports performed by an edge CM function, for example V-u-CM 230a. DL measurement and feedback depends on whether the device is in active mode or non-active (i.e. idle) mode. For active mode, the CM function performs Layer 1 channel measurement and selects sets of Network Nodes (NNs) as potential or candidate serving APs to transmit (Tx). For non-active mode, the CM function performs Layer 3 location tracking of a UE similar to existing approaches using a tracking area (TA), including using synch and TA ID used in 3G/4G systems. The edge CM function also performs the following actions. The edge CM function configures AP DL measurement and reporting. Further, the edge CM function receives and analyzes reports from devices. The edge CM function provides this information relating to the potential or candidate serving APs to software management entities such as service-optimized network auto creation and software-defined resource assignment.

For this CM-LT scheme A, the CM function in the device 161 configures the measurement process of the device HW/SW to create and transmit measurement reports to the network.

CM-LT Scheme B: Location Tracking by Periodic UL Transmission (Beacon) and Network Measurement In CM-LT Scheme B, location tracking is performed by performing periodic UL measurements (e.g., using a device-transmitted beacon) by an edge CM instance, for example V-u-CM 230a. This can include a per device beacon sequence transmission and subsequent measurement by the network. Such a UL measurement and feedback scheme depends on whether the device is in active mode or non-active mode. When the device is in active mode the network measures UL Layer 1 channel parameters for the beacon sequence transmission and selects a set of NN to transmit to the device. When the device is in non-active mode, regular TA location tracking is performed. The edge CM function also performs the following actions. The edge CM function configures the UL transmission (timing, power, code, etc.) by sending appropriate instructions to each device. The edge CM function also determines potential or candidate serving APs and provides this information to software management entities such as service optimized network auto creation and software defined resource assignment. The edge CM function also instructs the candidate serving APs with the appropriate parameters for location tracking signal reception for each device (timing, power, code, etc.).

For CM-LT scheme B, the CM function in the device 161 configures the UL beacon transmission of the device HW/SW to create and transmit the beacon with the appropriate parameters (timing, power, code, etc) to the network.

CM-LT Scheme C: Device Assisted Location Prediction by Network

In CM-LT Scheme C, location tracking involves device assisted location prediction by the CM network or a CM instance. For example, the system can evaluate historical locations of the device in order to predict location using a prediction algorithm and then perform periodic checks to correct the predicted model. In Scheme C, a Network side CM-LT function negotiates the prediction scheme (location prediction algorithm and parameters) using CM-LT messages transmitted between a serving AP and the device and also executes the prediction algorithm in order to track the device. In some embodiments, the CM-LT messages are Layer 3 messages. In some embodiments, the prediction scheme is periodically renegotiated. The network CM function also determines potential or candidate serving APs and provides this information to software management entities such as service optimized network auto creation and software defined resource assignment.

For CM-LT scheme C, the CM function in the device 161 implements a CM-LT function which negotiates the prediction scheme (location prediction algorithm and parameters) using CM-LT messages transmitted between a serving AP and the device and also executes the prediction algorithm. The device CM function 161 will obtain out-of-band location information (e.g. from GPS) to determine an estimate of the actual device location and compare the estimated location with the predicted location. The device CM function 161 will advise the network CM function if there is a discrepancy between the estimated and predicted location, which may trigger a re-negotiation of the prediction scheme.

CM-LT Scheme C can be selected if there is some indication that the device will probably follow a predictable path for a period of time. For example, if the device moves along a highway which connects cities, then one of the device CM function 161 or the network CM function 110 can commence a negotiation/handshake to execute such a CM-LT scheme. It should be appreciated that such a negotiation can be one-sided in some embodiments, with one of the device CM 161 or the network CM function 110 specifying the algorithm/parameters to use. As another example, if a UE is running mapping software that the user is using to navigate, then a predicted location can be sent based on known speed and projected paths.

CM-LT Scheme D: Location Tracking by Predefined-DL-Location Update (Which May be Paging-Free)

In CM-LT Scheme D, location tracking is performed by using periodic location updates which coincide with predefined DL transmissions. In some embodiments, this allows for paging-free transmissions as a location update is made and a connection is established prior to the predefined DL transmission. A predefined DL transmission is predefined in terms of its timing, but can vary in content. For example, a predefined DL transmission can be pre-arranged according to a schedule. For example, a network customer (e.g., a utility company with a large number of deployed MTC devices) can specify a location for a service class for MTC devices with pre-arranged DL transmissions (e.g. hourly or weekly at midnight). The device will send an UL message providing a location update immediately prior to the DL message, such that a connection can be established for the DL transmission. In some embodiments, the network side CM-LT function maintains a device/service DL transmission plan (which may be determined by the network customer). The network side CM-LT function also configures a location update scheme which can include an L2 or L1 UL location update signal transmission plan for each device to send a location update message. In some embodiments, the device update plan may be provided by the network customer, which tracks the device location by other means (e.g. GPS, etc.). The network CM function also determines potential or candidate serving APs and provides this information to software management entities such as service optimized network auto creation and software defined resource assignment, which may establish v-s-SGW to buffer and forward packets to the device. Further, the network side CM-LT function configures the serving APs to be set for reception (including providing timing, codes, etc.).

For CM-LT scheme D, the CM function in the device 161 configures the device HW/SW regarding the DL reception plan and the UL location update transmission plan (including timing, code, etc.).

CM-LT Scheme E: Location Tracking from Source of UL Data Transmission

In CM-LT Scheme E, location tracking is performed by locating the source of a UL data transmission. For example, a device may make regular or irregular UL message transmissions. If the interval of transmission and the movement speed of the device make the distance travelled by a device between transmissions relatively short (e.g. if a device communicates regularly, and/or the device is moving slowly), then the network can constantly learn the location of the device from its UL transmissions. For example, the network can track the device by evaluating the received signal strength at a number of different APs. In such a situation, there may be no need for a dedicated location tracking scheme as the network effectively receives a location update with each UL transmission. Further, in some embodiments the paging cycle for the device can be lengthened or in some cases eliminated if the DL transmission always depends on a UL transmission. This can save resources as the network does not need a dedicated tracking scheme or does not need to allocate resources until a UL is received. Note that a DL can depend on a UL transmission if a DL is only made in response to a UL. However, a DL can be considered to depend on the UL if it is sufficiently delay sensitive, i.e. if the DL can wait until a UL is made. The network CM-LT function maintains the tracking area of a device from the UL transmissions received from the device. In some embodiments, the network CM-LT function can provide information about the tracking area of a device upon request to software management entities such as service optimized network auto creation and software defined resource assignment.

CM-LT Scheme F: Location Tracking by Out-of-Band Location Based Info

In CM-LT Scheme F, location tracking is performed using Out-of-band location information. For example, embedding GPS location from the device or network application in a transmission request. The network CM-LT function maintains the tracking area of a device from the location update reports (which can include both location and location predictions) received from the device.

For CM-LT scheme F, the CM function in the device 161 obtains information from device location functions (e.g. GPS or GLONASS) in order to provide location update reports to the network. If a UE is running mapping software that the user is using to navigate, then a predicted location can be sent based on known speed and projected paths. In some embodiments, the device side CM-LT function can maintain a customized network MAP including TA information (received from network CM-LT). In some embodiments, the device side CM-LT function can determine the event of TA boundary crossing by comparing the TA MAP and the determined location (from GPS etc.) and perform a L3 location update once a TA boundary crossing event is identified.

CM-LT Scheme G: Location Tracking by Collaboration between Multiple Network Interfaces In this CM-LT Scheme G, location tracking is performed by collaboration between multiple network interfaces, which can also be called collaboration of vertical networks or converged location tracking. This can be applied for devices which can use multiple network interfaces (such as a RAN interface and a Wi-Fi interface as discussed with reference to FIGS. 6 and 7). For conventional networks, devices are typically configured to connect via a single interface at a time. For example, for data connections, if a device connects via Wi-Fi, then the device will typically disconnect from an LTE network (although it may stay connected to a GSM or other network for voice calls). However, any active interface provides implicit or explicit location information. This CM-LT Scheme G utilizes the network locating abilities of multiple interfaces. Accordingly, embodiments can simply track a device, regardless of the interface used by the device, so that the device is always reachable. Accordingly, embodiments can allow for the interaction between multiple CM-LT functions (e.g. one or more RAN network side CM-LT functions and one or more Non-radio access network (e.g. WiFi) CM-LT functions). In some embodiments, the network side CM-LT function (which may be a global CM function) receives network node reports on devices which are currently being served, which includes Device ID or network node location information or network node network address (NA) on a per device basis regardless of whether the network nodes are RAN or Wi-Fi APs. The network side CM-LT function maintains device TA information and provides the device TA information to other network functions (e.g. software control) for DL paging or data transmission. The device reports its device ID and/or its location or network address (e.g. its IP address) to network CM-LT. For example, the device would report its IP address to the Domain CM, which will forward the information to the appropriate edge node instantiating a V-u-CM function. In some embodiments, a device side CM-LT function configures an internal location update rule to disable location update messaging if it is connected to at least one interface and this CM-LT Scheme G is being implemented.

CM-LT Scheme H: Location Tracking using Group Based Location Updates

In this CM-LT Scheme H, location tracking is performed using group based location updates. For example, if there are multiple devices in close proximity in a synchronized vector (e.g. all devices inside a home, or moving together in a train, bus or other vehicle), then the individual devices can be located by locating the group. In some embodiments, a device can be designated as an ad-hoc agent to transmit a location update for the ad-hoc group. In some embodiments, the device side CM-LT function for the ad-hoc agent can be configured with Ad-hoc agent CM-LT functions. Ad-hoc agent CM-LT functions can include negotiating with a network on behalf of the group and sending location updates (determined by other schemes) on behalf of the group, and out of band (or D2D) group creation. In some embodiments, a network side CM-LT function updates location/TA for all devices for each location update received from the group (e.g. from the ad-hoc agent). In some embodiments, a network side CM-LT function negotiates with the ad-hoc agent for the devices within the ad-hoc group (which may, for example, be identified by a field embedded in a packet header). In some embodiments a network side CM-LT function can additionally perform other functions, for example as described with reference to other schemes. In some embodiments, the device side CM-LT function for each device within the group is configured for group creation but then allows the agent to provide locate update operations while the device belongs to the group. In some embodiments, users can be given the option to be tracked in other ways, i.e. not be tracked as part of the group (e.g. for privacy reasons).

CM-LT Scheme I: Location Tracking by Customer Assisted Lightweight Location Tracking In this CM-LT Scheme I, location tracking is performed by customer assisted location tracking. For example, an MTC customer may obtain location information of a device via an out-of-band resource. For example, if a device connects to a Wi-Fi AP with a fixed location, then that AP implicitly provides the UE location based on the location of the AP. Accordingly, DL packets will carry location information of the AP which a device based CM instance can relay to the network CM instance. In some embodiments, Software Defined resource assignment—Assisted Location can be employed to allow the UE to provide an out of band location update.

Activity Tracking Schemes A-D will now be discussed.

CM-AT Scheme A: Activity Tracking by Negotiation of Activity Pattern (3G/4G)

In this CM-AT Scheme A, activity tracking is performed through negotiation of activity pattern. It is noted that the "negotiation" can be one sided, with the network simply telling the mobile device when to wake-up from idle. This is the scheme currently applied by 3G/4G networks. In some embodiments, the network and device may negotiate the activity plan as to when the mobile device will wake-up from idle. In some embodiments, such a negotiation can be enhanced, for example by allowing for demand based pricing where discounts are provided during non-peak times. In such an embodiment a request can be made for UEs to have more frequent wake-ups or additional bandwidth for faster downloads during off-peak times. In some embodiments, the network side CM-AT function can negotiate with the device and configure the device activity pattern and provide this pattern to software management entities such as service optimized network auto creation and traffic engineering entities. In some embodiments, the device side CM-AT function can negotiate with the network and configure the device activity pattern and provide this pattern to a local device activity scheduler.

CM-AT Scheme B: Activity Tracking by Customer Assistance

In this CM-AT Scheme B, activity tracking is performed in conjunction with customer assistance. For example, a utility company provides a schedule of when each of its thousands of meters will report so that the network need only listen to these devices at the scheduled times. In this example, the customer provides DL/UL signal transmission plan to a network CM-AT function, which allocates network resources accordingly.

CM-AT Scheme C: Activity Tracking by Cross-Interface Communication in Devices (Interface Wake UP by Other Interface)

Figure 7:
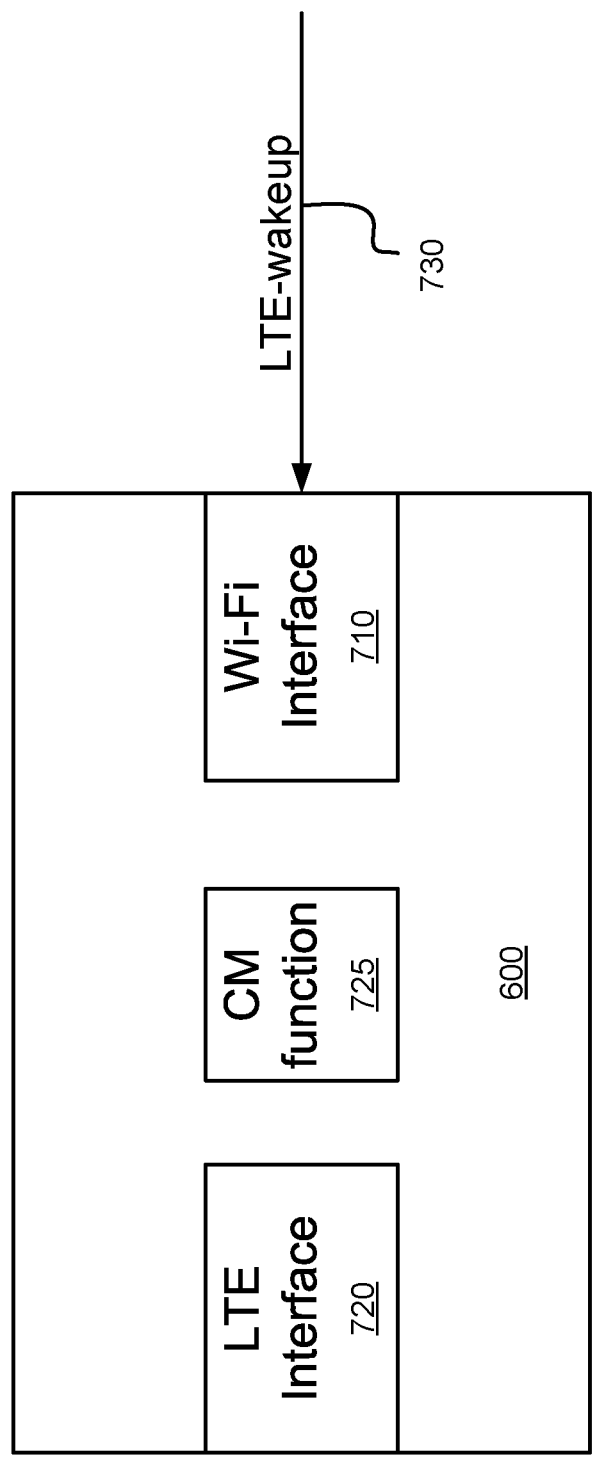
FIG. 7 is a block diagram illustrating a device with multiple interfaces according to an embodiment.

In this CM-AT scheme C, activity tracking is performed by cross-interface communication in devices. This can include one interface being instructed to wake up by another interface. For example, a device may have multiple interfaces where one interface could be used to configure another. For example, assuming UE-A, which can be device 600 in FIGS. 6 and 7, is using Wi-Fi, and UE-B requests a session with UE-A using a more secure medium. In this case, a network based CM function can send a configuration message (e.g. an interface wake-up message) to UE-A using the active Wi-Fi interface. This message instructs UE-A to use a RAN interface such that an LTE or a 5G encrypted channel can be used for the requested session with UE-B. Further details are provided below, with reference to FIGS. 6 and 7.

CM-AT Scheme D: Activity Tracking Based on Customer Provided Timing of DL.

In this CM-AT Scheme D, activity tracking is based on customer provided timing of DL delivery. An application server may know a device location and can transmit packets with a location field which network nodes can then evaluate and forward to the relevant AP. For example, DL packets may carry information on time/location information. A network based software defined resource assignment function delivers the DL packet based on the timing/location information.

CM-AT Scheme E: Device Assisted AT

In CM-AT Scheme E the device CM function can assist in predicting, or at least providing advance warning of a likelihood of, network usage. For example, some high-end UEs execute many applications (hereafter App), some of which have a higher likelihood of network activity than others. For example, if a user runs a word processing App, there is a small likelihood of immediate network activity. However if a user runs a browser App, there is a higher likelihood of network activity. Furthermore, in some embodiments the device CM function can provide further details in notifying the network as to the expected activity. For example, in some embodiments the device CM function can notify the network as to the expected delay sensitivity of the expected network activity. For example, if the user runs a video conference App, then the device CM function can notify the network to allocate resources for a likely delay sensitive session, and do so in advance of the App itself requesting such a session. In contrast if the user runs an email App, the device CM function can notify the network of the likelihood of a non-delay sensitive session. Accordingly the device CM function can provide device status information which can include information as to the likelihood of network transmission based on user input relating to at least one of the applications. In other embodiments a device can have different traffic profiles based on location. In one such example, a user will have a predictable traffic profile at a given time, but depending on the location the access mode will change. If a user is at work, the access network may be RAN, but when the user is at home the access network may be Wi-Fi. Depending on the user, there may be statistically predictable traffic (i.e. activity) patterns for each location. This results in the same user profile having different impacts on the network.

Accordingly, while conventional MMEs tracked activity only with respect to two states, idle and active, embodiments utilize additional schemes for performing activity tracking based on the nature of the devices/services and traffic patterns. While only 5 examples are discussed herein, it should be appreciated that additional AT tracking schemes based on the nature of the devices/services and traffic patterns can be utilized. Further, other factors can be considered, for example the device status information. The device status information can include device battery state, for example if the battery state is below a threshold the device can be put into a lower power mode, which will affect how often it communicates with the network. This information can be passed on to, and utilized by the network.

An aspect provides for the instantiation of virtual CM functions established at appropriate physical nodes to provide device specific CM. A non-exhaustive list of the virtual functions which can be established include virtual user or specific gateways virtual UEs, as well as the virtual CM functions described.

Determining where to instantiate a VNF for a device to use is a trade-off between a number of factors, which include being as close to the device as possible, being sufficiently high enough up the hierarchical tree to minimize the need to migrate the VNF, the availability of resources, what the subscriber is willing to pay, and other network demands.

It should be appreciated that MTC devices can be clustered into groups, which allows for group based CM. For example, the location of a group of MTC devices helps to determine the location of the virtual service specific gateways. Further, rule based allocations of resources can be made across groups of similar devices. Further, some activity can be predicted based on group behaviour. For example, if a group of sensors proximate in location all initiate transmissions at the same time, resources can be allocated to related management devices in expectation of potentially large transmissions to and from said management devices.

As discussed with reference to FIG. 2, embodiments utilize a layered or hierarchical set of CM functions. According to some embodiments, the layers include a Global CM function, Domain CM functions and Edge CM functions. In some embodiments, the Global CM function maintains a database of service characteristics of devices which attach to a network, in terms of their predictability or non-predictability, both with respect to location and activity. In some embodiments, the Global CM function maintains a database of service QoE requirements associated with the device, instructs an edge GM function to select an appropriate resource allocation scheme to ensure QoE requirements are met. In some embodiments, the Global CM function maintains device activity information (service ID/device ID: activity pattern) and device location information (service ID/device ID: Domain ID, network address of domain gateway functions, etc.). In some embodiments, the Global CM function sends some or all of this information to the Edge GM functions. In some embodiments, the Global CM function receives domain Handover (HO) message from a serving domain CM and transmits a HO message to a target domain CM. In some embodiments, the Global CM function triggers the instantiation, configuration and activation of virtual domain CM functions. In some embodiments, the Global CM function acts as an intermediary for inter-CM signaling (as will be discussed further below).

In some embodiments, a Domain CM function triggers the instantiation, configuration and activation of virtual per device/user/service CM functions (e.g., V-u-CM 230*a*). In some embodiments which utilize network slicing, a Domain CM function attaches a device to a slice. In some embodiments, a Domain CM function configures CM schemes for each v-u-CM or v-s-CM, based on the database of service characteristics of devices maintained either by the Domain CM function or by the Global CM function. In some embodiments, a Domain CM function migrates functions, such as v-s-SGW. In some embodiments, a Domain CM function transmits HO requests to the Global CM function as needed. In some embodiments, a Domain CM function processes non-registered devices.

In some embodiments, an Edge CM function performs customized CM-LT/AT/TA as described. In particular, the Edge CM function performs the selected location and activity tracking schemes, which may be selected by the Edge CM function or the Domain CM function. In some embodiments, an Edge CM function maintains a tracking area (TA) for each device and detects the device crossing a TA or Domain boundary. In some embodiments, an Edge CM function reports to a Domain CM function.

CM determinations can be used to expand or contract the resources allocated to a wireless device. Whereas an MME of an LTE network was concerned with radio access resources and resourced in the eNodeB, the CM functionality discussed above allows for a more general resource allocation. For example, CM-LT can assist in determining the location of virtual resources allocated to the mobile device, while CM-AT can determine the amount of resource allocation required.

Embodiments of CM can be of particular advantage in networks which allow for a higher granularity of resource allocation, such a networks based on a serving cloud architecture, such as Cloud RAN (C-RAN) or Distributed-RAN (D-RAN) architectures. In some such embodiments, the CM-LT function can determine the candidate cloud for a device, whereas the SDRA-TE/SDRA-A may determine the serving cloud for the device. In some embodiments, the candidate cloud for a device can also act as the service cloud of the same device.

FIG. 6 is a diagram illustrating a device connecting to multiple networks using multiple interfaces according to an embodiment. In this embodiment, wireless device 600 is shown being able to connect using two interfaces, namely a Wi-Fi interface to connect to a Wi-Fi network using Wi-Fi AP 650, and a second interface to connect to RAN. The RAN network may be, for example, an LTE network, a legacy (e.g. Third Generation (3G)) network or a next generation (e.g. Fifth Generation (5G)) network. The device 600 uses a RAN interface to connect to the RAN via RAN AP 630. The RAN network includes a RAN CM function 620, whereas the Wi-Fi network includes a Wi-Fi CM function 640. A global CM function 610 can perform global CM functions for both the RAN and Wi-Fi networks. The global CM function 610 can also facilitate inter-CM signaling for allowing the two networks to locate and communicate with the device 600, as will be discussed in more detail below.

FIG. 7 is a block diagram illustrating a device with multiple interfaces, for example device 600 of FIG. 6, according to an embodiment. Device 600 is shown to include two interfaces, namely an LTE interface 720 and a Wi-Fi interface 710. The example discussed will assume RAN AP 630 is an LTE AP. However, it should be appreciated that LTE interface 720 is just used by way of example and device 600 can include other RAN interfaces to communicate with other RAN networks. Device 600 further includes a CM function 725 to interact with network based CM functions. As will be appreciated, a device will often disconnect from an LTE network when a Wi-Fi connection is available. As previously discussed, LTE devices when idle communicate with the network according to a paging cycle to determine if there is data to be received. The LTE interface 720 wakes up according to the paging cycle, which can be configured by the LTE network. In the embodiment shown, the CM function 725 can instruct the LTE interface 720 to communicate with the network (e.g. listen for messages from the network) prior to completion of a previously set paging cycle. For example, an LTE network may have data to be sent to the device using the LTE interface 720. Inter CM signaling, for example between RAN CM 620 and Wi-Fi CM 640, possibly via Global CM 610, may instruct Wi-Fi AP 650 to transmit an LTE wake-up message 730 to the device. Responsive to the device receiving the LTE wake-up message 730, the local CM function 725 will instruct the LTE interface 720 to communicate with the network.

Figure 8:
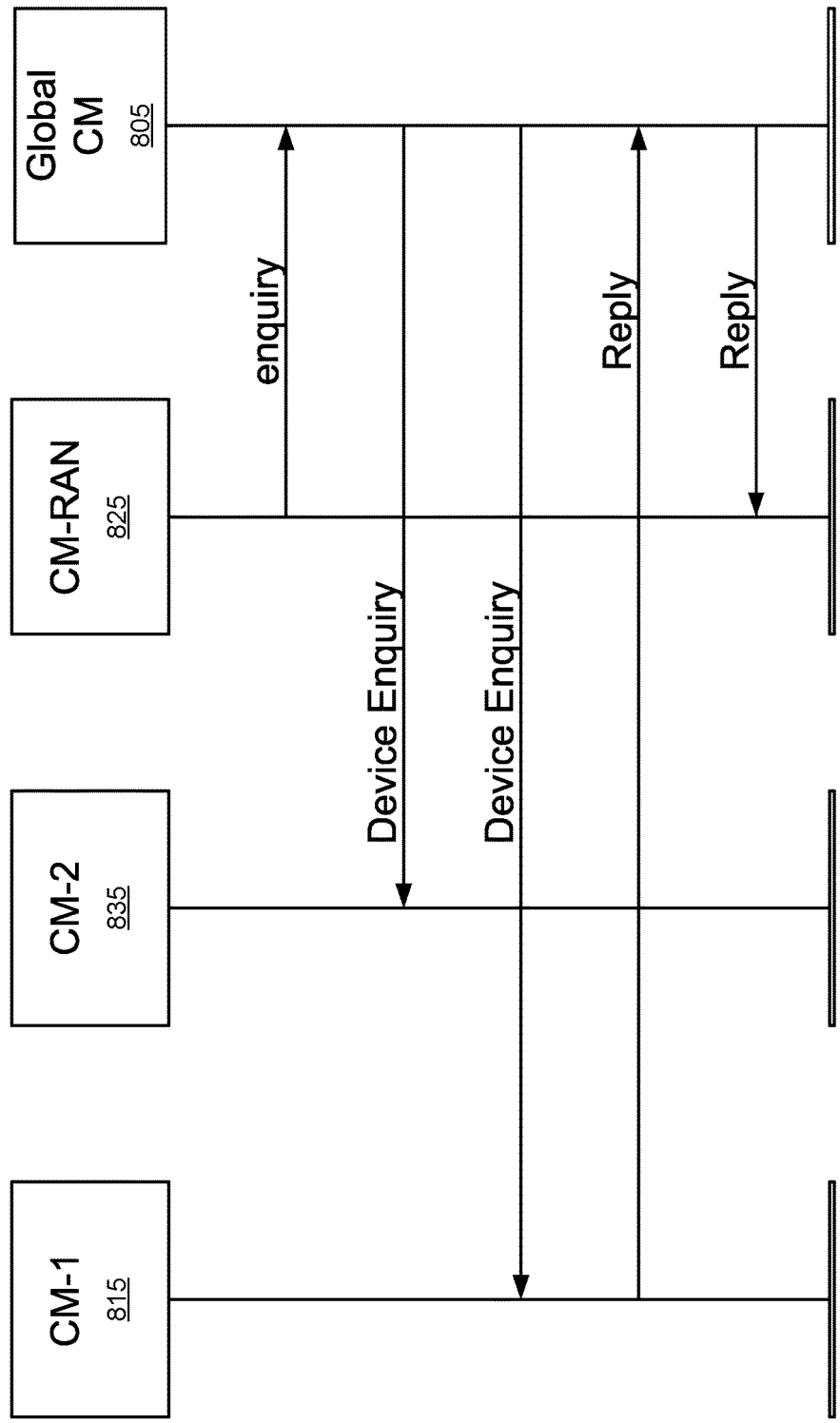
FIG. 8 is a signaling diagram illustrating inter-CM signaling according to an embodiment.

FIG. 8 is a signaling diagram illustrating an example of inter-CM signaling according to an embodiment. The example shown in FIG. 8 involves an example network, for example a RAN network receiving a transmission for a device. In this simplified example, the device is assumed to connect to either the RAN network or one of two other networks, for example network 1 which includes CM-1 function 815 or network 2 which includes CM-2 function 835. Other networks can also be reached but are not shown. Network 1 can be a first Wi-Fi network or another RAN network while network 2 can be a second Wi-Fi network or another RAN network. The CM-RAN function 825 receives the request and transmits an enquiry to a global CM function 805. The enquiry will identify the device. Various indicia can identify the device including a User ID (such as phone number), or some form of UE ID such as the International Mobile Station Equipment Identity (IMEI) code or the International Mobile Subscriber Identity (IMSI) code. Upon receiving the enquiry, global CM function 805 will send a device enquiry message (which can also be called a query message) to each of CM-1 and CM-2 to determine which CM can reach the device. As mentioned, such a message would be sent to other networks (not shown). In this example, CM-1 815 is aware of the device (e.g. the device may be connected to network 1) and responds with a reply message to the Global CM 805. The global CM 805 replies to the CM-LTE 825, indicating that the device can be reached via network 1. It is noted that CM functions CM-1, CM-2 and CM-RAN can be domain functions.

Figure 9:
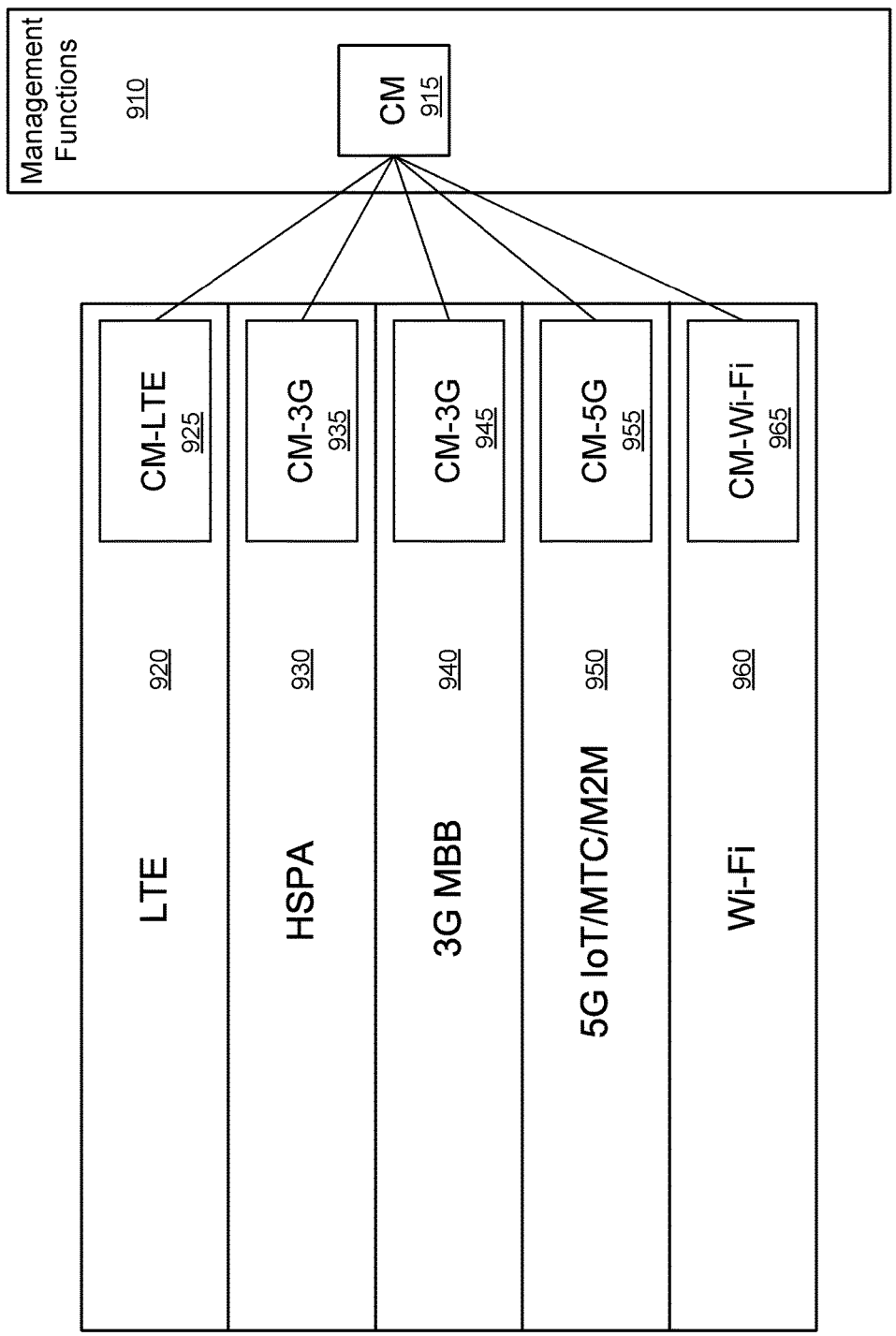
FIG. 9 is a diagram illustrating CM functions for multiple network slices according to an embodiment.

FIG. 9 is a diagram illustrating CM functions for multiple network slices according to an embodiment. A network operator may utilize network slicing, allocating resources and infrastructure to different network slices. In FIG. 9, one CM function is shown per slice for simplicity, but this is not a limitation and such a network may instantiate one or more CM functions for each slice. For example, there may be an LTE slice 920 with CM-LTE function 925, a High Speed Packet Access (HSPA) slice 930 with CM-3G function 935, a 3G Mobile BroadBand (MBB) slice 940 with CM-3G function 945, a 5G IoT/MTC/M2M slice 950 with CM-5G function 955, and a Wi-Fi slice 960 with CM-Wi-FI function 965. Inter-CM messaging can be routed through a Global CM function 915 which is part of a set of overall network management functions 910. Inter-slice messaging between CM functions can operate in a manner similar to that discussed with respect to FIG. 8.

In some embodiments, some or all of the following benefits may be realized through the replacement of conventional connection management with the more flexible connectivity management methods discussed above. In some embodiments, CM can provide improved management and reach of user devices. For example, some embodiments can provide information of device location and activity upon request at any time, which can provide per-device location tracking and per-device state management. Some embodiments allow network operators to predict when a device is available to receive data (and in some embodiments from which channel). This can also allow network operators to predict when a device is expected to transmit data (and in some embodiments on which channel). In some embodiments, CM can be supplied as a service which can allow a mobile device to be served by a single service provider as the device makes use of different parties' infrastructure. Some embodiments can allow for architectures which provide roaming free service as a device is always reachable.

Further, in some embodiments, CM allows for operators to apply CM methods and functions on a per service basis, to provide CM for a class of devices. For example, a utility company many be a customer to a network operator. The utility company would provide information relating to utility meter devices which communicate using the WCN. These devices are typically fixed in location, and can have very predictable activity. Further, the utility company can provide both the location of the devices, and scheduling information as to when each meter will report its readings. This information can be used to allocate per service V-s-CM resources on an as needed basis.

Figure 10:
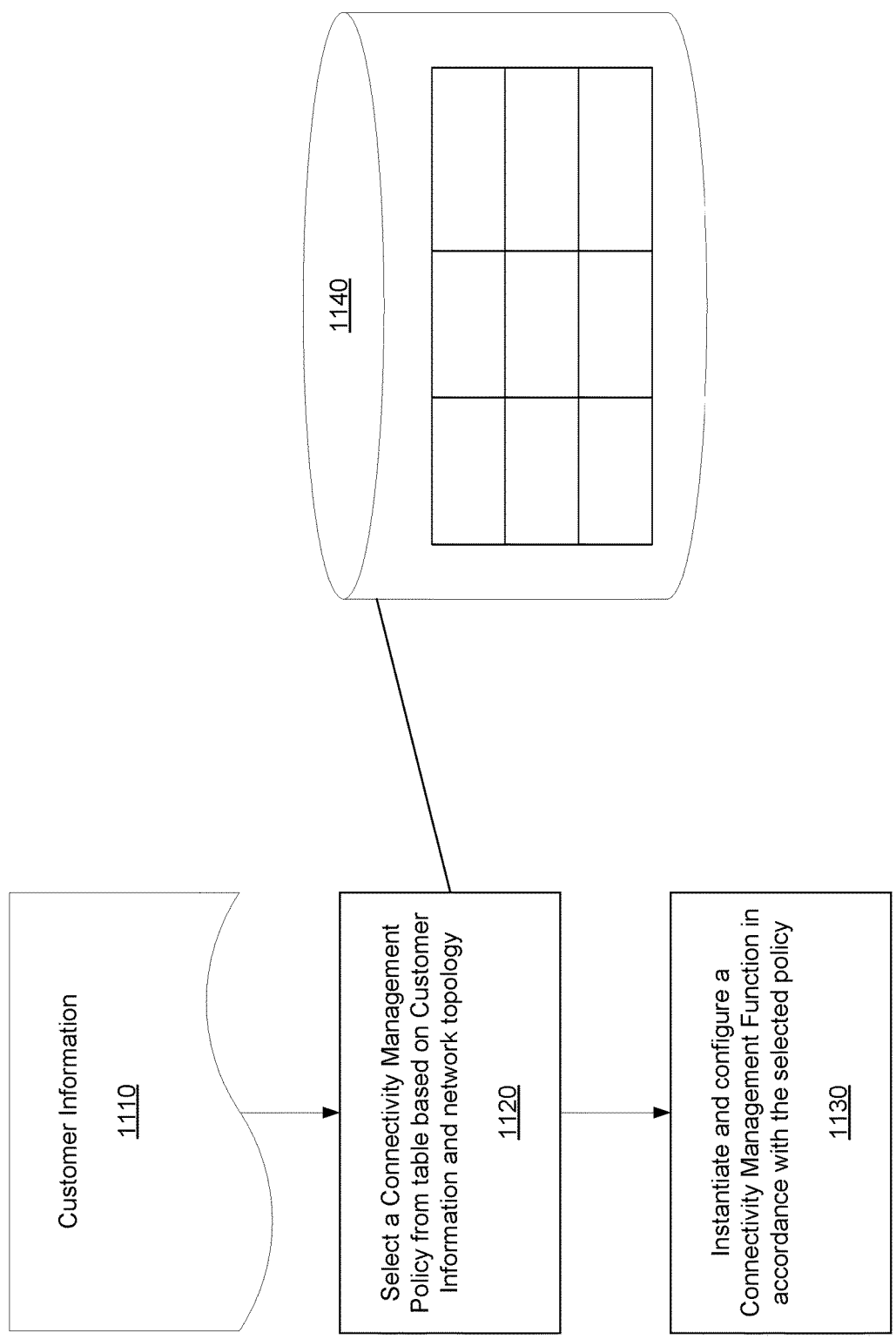
FIG. 10 is a flowchart illustrating a method according to an embodiment.

FIG. 10 is a flowchart illustrating a method according to an embodiment. Customer information is provided at step 1110 for a requested service. As but one example, the customer can be the utility company described above, and the customer information can include the location and timing schedules for the utility meters. For each service, the system can select a CM policy 1120 from a table, 1140 based on the customer information. Accordingly the CM policy can be selected dependent on location predictability characteristics and on activity predictability characteristics for a service. In some embodiments, other factors such as the network topology can also be used in determining the CM policy. The table 1140 can be, for example, tables 4A and 4B as described above, however it should be appreciate that those tables were just examples, and other classification schemes can be utilized for selecting the CM policy. Upon selecting a policy, instantiation and configuration of a CM function in the network can be performed in 1130. In some embodiments, the CM functions can be instantiated, configured and/or activated on an as needed basis.

Figure 11:
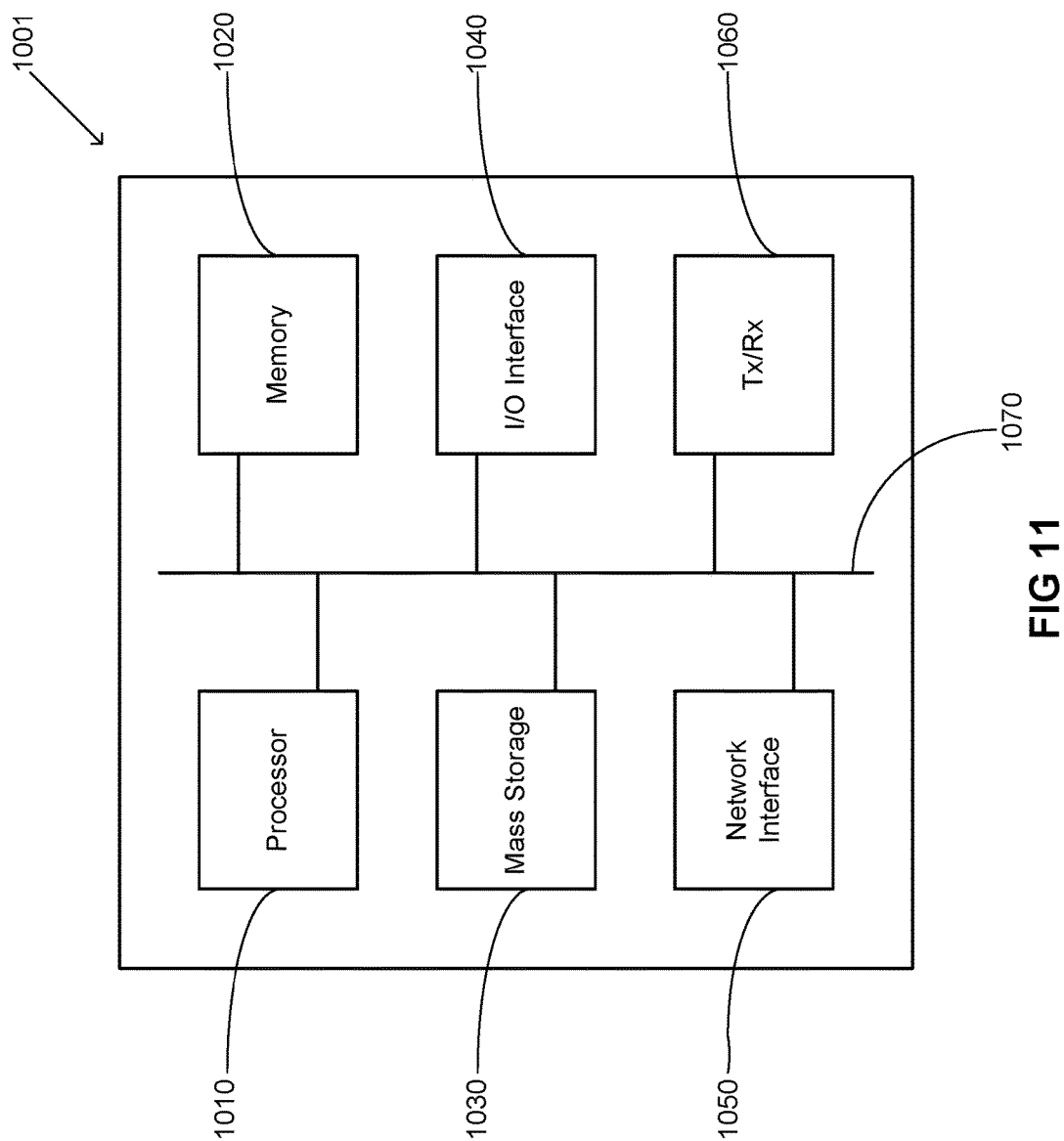
FIG. 11 is a block diagram illustrating a processing system according to an embodiment.

FIG. 11 is an exemplary block diagram of a processing system 1001 that may be used for implementing the various network functions. As shown in FIG. 11, processing system 1001 includes a processor 1010, working memory 1020, non-transitory storage 1030, network interface, I/O interface 1040, and depending on the node type, transceiver 1060, all of which are communicatively coupled via bi-directional bus 1070.

According to certain embodiments, all of the depicted elements may be utilized, or only a subset of the elements. Further, the processing system 1001 may contain multiple instances of certain elements, such as multiple processors, memories, or transceivers. Also, elements of processing system 1001 may be directly coupled to other components without the bi-directional bus.

The memory may include any type of non-transitory memory such as static random access memory (SRAM), dynamic random access memory (DRAM), synchronous DRAM (SDRAM), read-only memory (ROM), any combination of such, or the like. The mass storage element may include any type of non-transitory storage device, such as a solid state drive, a hard disk drive, a magnetic disk drive, an optical disk drive, a USB drive, or any computer program product configured to store data and machine executable program code. According to certain embodiments, the memory or mass storage have recorded thereon statements and instructions executable by the processor for performing the aforementioned functions and steps.

The processing system 1001 can be used to implement a UE or host which executes the various network CM functions described herein.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can include the device memory as described above, or stored in removable memory such as compact disk read-only memory (CD-ROM), flash memory, or a removable hard disk. The software product includes a number of instructions that enable a computer device (computer, server, or network device) to execute the methods provided in the embodiments of the present disclosure. For example, such an execution may correspond to a simulation of the logical operations as described herein. The software product may additionally or alternatively include number of instructions that enable a computer device to execute operations for configuring or programming a digital logic apparatus in accordance with embodiments of the present disclosure.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

The invention claimed is:

1. A method of connectivity management (CM) for use in a wireless network, the method comprising:
   selecting a network connectivity management policy for a service in the wireless network in accordance with characteristics of the service including device capability, and location predictability associated with devices supported by the service; and
   transmitting an instruction to a network connectivity management function associated with the service, the instruction indicating the selected network connectivity management policy.

2. The method of claim 1 further including the step of receiving the characteristics of the service from a customer.

3. The method of claim 1 wherein the device capability includes information about the radio interfaces supported by devices supported by the service.

4. The method of claim 1 wherein the step of selecting is performed in accordance with an activity profile associated with the service.

5. The method of claim 1 wherein the location predictability indicates a degree of location predictability including a fixed position, predictable within a range and unpredictable.

6. The method of claim 1 wherein the step of selecting is performed by selecting a policy profile from a set of pre-defined policies in accordance with an activity profile and location predictability profile associated with the service.

7. The method of claim 6 wherein the activity profile indicates an activity status including one of active, idle and predicted to be active states.

8. The method of claim 7 wherein the predicted to be active state indicates when the device is predicted to be active.

9. The method of claim 6 wherein the activity profile and location predictability profile are received from a customer.

10. The method of claim 1 further including transmitting an instruction to instantiate the network connectivity management function on a computing platform in the wireless network.

11. The method of claim 1 further including selecting the network connectivity management function from a set of connectivity management functions in accordance with the selected policy.

12. The method of claim 1 further including the steps of:
   re-selecting a network connectivity management policy in accordance with location predictability and activity tracking information obtained through monitoring the service; and
   transmitting an instruction to the connectivity management function associated with the service, indicating the re-selected network connectivity management policy.

13. A connectivity manager, for use in a wireless network, comprising:
   a network interface for communicating with other nodes in the wireless network;

a non-transitory memory for storing instructions; and a processor for executing the stored instructions, that upon executing the instructions causes the connectivity manager to:

select a network connectivity management policy for a service in the wireless network in accordance with characteristics of the service including device capability, and location predictability associated with devices supported by the service; and transmit, over the network interface, an instruction to a connectivity management function associated with the service, the instruction indicating the selected network connectivity management policy.

14. The connectivity manager of claim 13 wherein the processor is further configured to perform the selecting and transmitting in response to receipt of the characteristics of the service from a customer.

15. The connectivity manager of claim 13 wherein the device capability includes information about the radio interfaces supported by devices supported by the service.

16. The connectivity manager of claim 13 wherein the processor is further configured to select the network connectivity management profile in accordance with an activity profile associated with the service.

17. The connectivity manager of claim 13 wherein the location predictability indicates a degree of location predictability including a fixed position, predictable within a range and unpredictable.

18. The connectivity manager of claim 13 wherein the processor is further configured to select the network connectivity management profile by selecting a policy profile from a set of predefined policies in accordance with an activity profile and location predictability profile associated with the service.

19. The connectivity manager of claim 18 wherein the activity profile indicates an activity status including one of active, idle and predicted to be active states.

20. The connectivity manager of claim 19 wherein the predicted to be active state indicates when the device is predicted to be active.

21. The connectivity manager of claim 18 wherein the activity profile and location predictability profile are received from a customer.

22. The connectivity manager of claim 13 wherein the processor is further configured to cause the connectivity manager to transmit, over the network interface, an instruction to instantiate the network connectivity management function on a computing platform in the wireless network.

23. The connectivity manager of claim 13 wherein the processor is further configured to cause the connectivity manager to select the network connectivity management function, from a set of network connectivity management functions in the network, in accordance with the selected policy.

24. The connectivity manager of claim 13 wherein the processor is further configured to cause the connectivity manager to:

re-select a network connectivity management policy in accordance with location predictability and activity tracking information obtained through monitoring the service; and transmit, over the network interface, an instruction to the network connectivity management function associated with the service, indicating the re-selected network connectivity management policy.

* * * * *

UNITED STATES PATENT AND TRADEMARK OFFICE
CERTIFICATE OF CORRECTION

PATENT NO. : 10,200,480 B2
APPLICATION NO. : 15/195673
DATED : February 5, 2019
INVENTOR(S) : Hang Zhang, Sophie Vrzic and Nimal Gamini Senarath Page 1 of 1

It is certified that error appears in the above-identified patent and that said Letters Patent is hereby corrected as shown below:

In the Specification

Column 6, Line 29:
"similar in theft needs, and that when this was not the case it"
Should read:
--similar in their needs, and that when this was not the case it--

Column 7, Line 3:
"individual device, but also avows the network overall to"
Should read:
--individual device, but also allows the network overall to--

Signed and Sealed this
Twenty-ninth Day of October, 2019

Andrei Iancu
*Director of the United States Patent and Trademark Office*